United States Patent
Arbegard et al.

(10) Patent No.: US 12,353,267 B2
(45) Date of Patent: Jul. 8, 2025

(54) KEYPAD COMPRISING KEYS CAUSING BOTH MCU WAKE-UP AND KEY DETECTION

(71) Applicant: ASSA ABLOY AB, Stockholm (SE)

(72) Inventors: Bernt Arbegard, Altura (PT); Robin Dahlbäck, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/292,000

(22) PCT Filed: Aug. 29, 2022

(86) PCT No.: PCT/EP2022/073920
§ 371 (c)(1),
(2) Date: Jan. 25, 2024

(87) PCT Pub. No.: WO2023/031102
PCT Pub. Date: Mar. 9, 2023

(65) Prior Publication Data
US 2024/0338069 A1    Oct. 10, 2024

(30) Foreign Application Priority Data
Aug. 31, 2021   (SE) .................................... 2151089-6

(51) Int. Cl.
*G06F 1/3234*   (2019.01)
*G06F 3/02*     (2006.01)

(52) U.S. Cl.
CPC .............. *G06F 1/3271* (2013.01); *G06F 3/02* (2013.01)

(58) Field of Classification Search
CPC ......... G05B 19/00; G06F 1/32; G06F 1/3271; G06F 3/02; G07C 9/00
See application file for complete search history.

(56) References Cited

U.S. PATENT DOCUMENTS

| 4,809,199 A | 2/1989 | Burgess et al. |
| 5,381,142 A | 1/1995 | Simmons, Jr. |

(Continued)

FOREIGN PATENT DOCUMENTS

| CN | 112835317 | 5/2021 |
| WO | 2023031102 | 3/2023 |

OTHER PUBLICATIONS

"PCT EP2022073920 ISR 20230103", (Jan. 3, 2024), 5 pages.
(Continued)

*Primary Examiner* — Julie Anne Watko
(74) *Attorney, Agent, or Firm* — Schwegman Lundberg & Woessner, P.A.

(57) ABSTRACT

It is provided it is provided a keypad comprising: a voltage bus configured to distribute power in the keypad; and a plurality of keys: a plurality of row key connections; and a plurality of column key connections: A wake-up signal causes a microcontroller to transition from a low-power state to an active state such that the microcontroller can detect which one of the plurality of keys was actuated. Each key is connected to a single row key connection and a single column key connection. Each row key connection and/or each column key connection is provided with a respective port circuit that is configured to connect the key connection with keys of the keypad when the wake-up signal is activated. Each port circuit comprises a respective port switch that is turned off in the low-power state to disconnect the column key connections/row key connections from the keys of the keypad.

6 Claims, 2 Drawing Sheets

(56) References Cited

U.S. PATENT DOCUMENTS

| | | | | |
|---|---|---|---|---|
| 5,539,400 | A | * | 7/1996 | Mears ................... H03M 11/20 341/26 |
| 5,692,203 | A | | 11/1997 | Grodevant |
| 2005/0243059 | A1 | * | 11/2005 | Morris ................. H04W 52/04 345/158 |
| 2005/0285449 | A1 | * | 12/2005 | Rush .................... G06F 1/1613 345/184 |
| 2007/0159363 | A1 | * | 7/2007 | Suen .................... H03M 11/20 341/26 |
| 2013/0249714 | A1 | | 9/2013 | Ho |

OTHER PUBLICATIONS

"PCT EP2022073920 Written Opinion 20230103", (Jan. 3, 2024), 8 pages.
"210548SE Office action_20230619", (Jun. 19, 2023), 5 pages.
"210548SE Search report PRV", (Apr. 6, 2022), 7 pages.

* cited by examiner

KEYPAD COMPRISING KEYS CAUSING BOTH MCU WAKE-UP AND KEY DETECTION

CROSS-REFERENCE TO RELATED APPLICATION(S)

This application is a national stage application under 35 U.S.C. § 371 of PCT Appl. No. PCT/EP2022/073920, titled "Keypad Comprising Keys Causing Both MCU Wake-Up and Key Detection," filed Aug. 29, 2022, which claims priority to Swedish Patent Appl. No. 2151089-6, filed Aug. 31, 2021, each of which is incorporated herein by reference in its entirety.

TECHNICAL FIELD

The present disclosure relates to the field of keypads and in particular to a keypad comprising keys causing both MCU (microcontroller unit) wake-up and key detection.

BACKGROUND

Keypads are used for a great variety of applications, e.g. electronic locks, alarm panels, etc. Keypads can be battery powered, for simplifying installation wiring and adding flexibility in location of installation.

However, for most of the time, keypads are in a low-power state, such as standby. The electrical energy consumption of the battery when in the low-power state severely limits the battery life.

It is a significant challenge to reduce the power consumption when the keypad is in the low-power state, while also making the keypad responsive when it needs to be used for user input.

SUMMARY

One object is to reduce power consumption of a keypad in low-power state while allowing a single key press from a user to both activate the keypad (and its MCU) and be used for user input.

According to a first aspect, it is provided a keypad comprising: a voltage bus configured to distribute power in the keypad; and a plurality of keys respectively actuable to cause closing of a circuit; a plurality of row key connections; and a plurality of column key connections; wherein each key is configured to, when actuated, cause at least one switch to close, causing the voltage bus to be connected to a wake-up control signal point. A wake-up signal is activated when connected to the voltage bus, causing a microcontroller to transition from a low-power state to an active state such that the microcontroller can detect which one of the plurality of keys was actuated. The keypad keys are provided in a matrix with rows and columns. Each key is connected to a single row key connection and a single column key connection, such that when actuated, each key provides a connection between a single column key connection and a single row key connection. Each one of the row key connections and/or each one of the column key connections is provided with a respective port circuit that is configured to connect the key connection with keys of the keypad when the wake-up signal is activated. Each port circuit comprises a respective port switch that is turned off in the low-power state to disconnect the column key connections or row key connections from the keys of the keypad.

The keypad may comprise a power regulator configured to selectively supply power to the MCU, wherein the wake-up signal being activated causes the power regulator to start supplying power to the microcontroller to thereby power up the microcontroller.

The power regulator may be a DC/DC converter.

A low-pass filter may be provided between the plurality of keys and the at least one switch.

Each key may be configured to, when actuated, connect the voltage bus to a control terminal of a first switch, thereby supplying a control signal to a second switch that closes a connection between the voltage bus and the wake-up signal.

At least one diode may be provided between the plurality of keys and the at least one switch.

The keypad may further comprise the microcontroller.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein provide a very power efficient keypad. An MCU (microcontroller unit) of the keypad can normally be in a low-power mode, such as a sleep mode or completely powered off. When a user presses a key on the keypad, in a first phase, the key causes a wake-up signal by connecting the wake-up signal with a voltage bus. The wake-up signal causes power to be supplied to the MCU, which is powered up into a fully operational active state. In a second phase, the MCU detects which key of the keypad that is actuated. The first phase is sufficiently quick to allow the MCU to also detect the key, even if a user only presses the key shortly. Since the wake-up in the first phase is based on levels, rather than differentials, the wake-up is stable and resilient against interference. Moreover, one key press by a user causes both the wake-up and the reading of the key that is pressed; no special wake-up manoeuvre is needed by the user.

Figure 1:
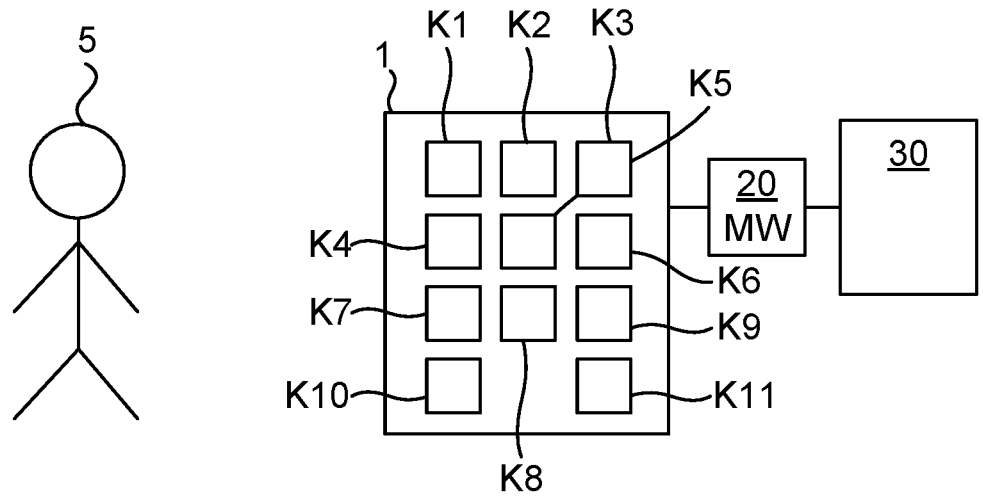
FIG. 1 is a schematic diagram illustrating an environment in which embodiments presented herein can be applied.

FIG. 1 is a schematic diagram illustrating an environment in which embodiments presented herein can be applied.

A keypad 1 is used for receiving user input from a user 5. The keypad is connected to a microcontroller unit (MCU) 20. Optionally, the MCU 20 is integrated in the keypad 1. The MCU 20 is connected to an electronic device 30 that receives as an input an indication of the key(s) that the user presses on the keypad 1. This enables the keypad 1 to be used as user input for the electronic device 30. Optionally, the electronic device 30 is combined with the MCU 20 and the keypad 1. The electronic device 30 can be any device that benefits from user input based on the keypad 1. For instance, the electronic device can be an electronic lock, an alarm system, or any other low-power system with a keypad interface. The keypad 1 is powered by a power source being a battery, e.g. a primary (disposable), secondary (rechargeable) battery, capacitor or any suitable component that can store and supply electrical energy.

The keypad 1 in this example comprises eleven keys K1-K11. Each key K1-K11 is actuable to cause closing of a circuit. In other words, when the user presses a key, the key causes a connection between two points and when the user releases the key, the two points are disconnected from each other. It is to be noted that the number of keys is not important; the keypad can have any suitable number of keys. The keypad 1 can also contain other elements, e.g. light emitting diodes (LEDs), a display, etc. (not shown).

Figure 2:
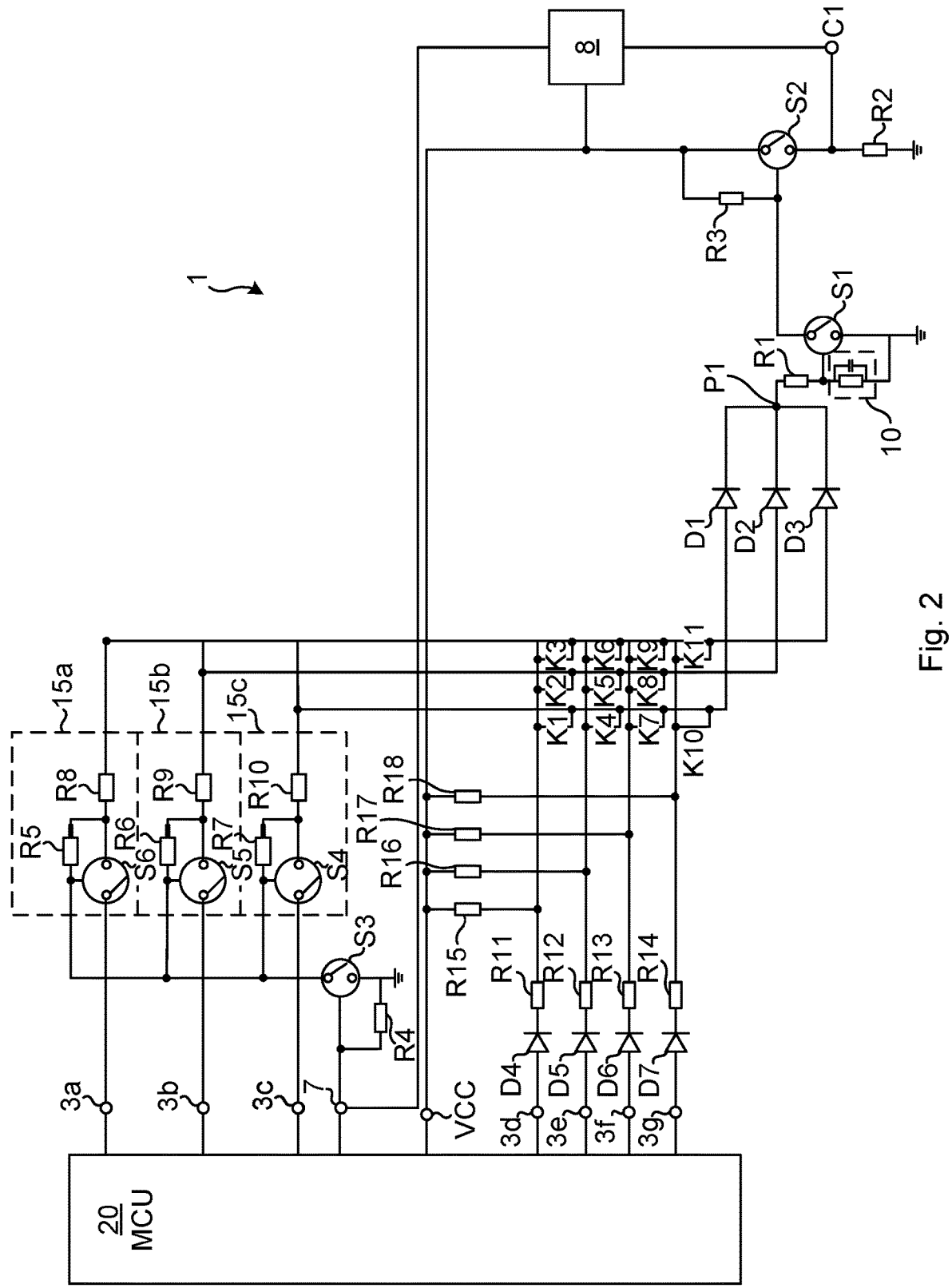
FIG. 2 is a schematic circuit diagram illustrating one embodiment that can be used in the environment of FIG. 1.

FIG. 2 is a schematic circuit diagram illustrating one embodiment that can be used in the environment of FIG. 1. The circuit diagram is presented in accordance with an example where one of the keys is actuated (i.e. pressed) by a user 5. This key actuation causes, in a first phase, the MCU 20 to be woken up to an active state, and in a second phase, the MCU to detect which one of the keys was actuated. The same procedure is applicable for any one of the keys K1-K11. The example presented herein assumes a positive voltage on the voltage bus, also known as Voltage Common Collector bus VCC, but the same principles are equally applicable with a negative voltage on VCC. The VCC is connected to a power source, such as one or more batteries. The voltage bus VCC is configured to distribute power in the keypad.

The switches mentioned hereinafter can be any suitable electronically controllable switches, such as transistors, controllable via supplying a control signal on its control terminal, such as gate (or base, when applicable). While the term gate is used hereinafter for the control terminal of the switch, this term is to be interpreted as any suitable control terminal of the switch. In one embodiment, the switches are implemented using MOSFETs (Metal-oxide-semiconductor Field Effect Transistors) that provide great power efficiency.

Whenever the term point is mentioned herein, this indicates a logical point in the circuit and may, but does not need to, correspond to a physical connection terminal.

The first (wake-up) phase will now be described. When this example starts, the MCU 20 is in a low-power state, such as being in a standby state, being powered off or in a sleep state. The MCU is configured with its input/output (I/O) pins respectively being connected to a plurality of row key connections 3*d*-*g*, one for each key row, and a plurality of column key connections 3*a*-*c*, one for each key column. Each key K1-K11 is connected to a single row key connection and a single column key connection, such that when actuated, each key provides a connection between a single column key connection and a single row key connection.

The VCC is connected to the power source. In this example, the keys K1-K11 are provided in rows and columns, corresponding to a numerical keypad. Each one of the keys K1-K11 is connected on one pole, via row-wise common resistors R15-R18 to VCC. The other pole of the keys K1-K11 is connected, via column-wise diodes D1-D3 to a common point P1. Hence, when any one of the keys K1-K11 is pressed, the common point P1 is pulled up to VCC. When the common point P1 is pulled up, this controls a first switch S1, via its gate, to enter a conducting state.

A resistor is provided between the gate of the first switch S1 and ground to ensure that the switch S1 is opens in the low-power state. Furthermore, a low-pass filter 10 is optionally provided between the plurality of keys K1-K11 and the at least one switch S1, S2, e.g. on the gate of the first switch S1. Depending on the configuration of the low-pass filter 10, the resistor between the gate of the first switch S1 and ground can optionally form part of the low pass filter 10, as shown in FIG. 2. The low-pass filter 10 filters out interference (e.g. external interference such as EMC (electromagnetic compatibility) interference) or transients when one of the keys K1-K11 is actuated. The low pass filter can prevent undesired accidental wake-ups, which only consume power, thus saving even more energy. While, in this example, the low-pass filter 10 is implemented using an RC filter, the low-pass filter 10 can be implemented in any suitable manner. The main current path of the first switch S1 (e.g. via the source and drain when the first switch is a MOSFET) is connected on one end to ground and on the other end to the gate of a second switch S2. Hence, when the first switch S1 is set in conducting state, also the second switch S2 is set in a conducting state. One end of the main current path (e.g. via the source and drain when the second switch is a MOSFET) of the second switch S2 is connected to VCC (and via a resistor R3 to its gate) and the other end is connected to a wake-up control signal point C1, as well as to ground via a resistor R2 to provide a positive voltage on the wake-up control signal point C1 when in active mode. While FIG. 2 discloses an embodiment with two switches S1, S2 between the keys K1-K11 and the wake-up control signal point C1, this can also be implemented with an embodiment comprising a single switch between the keys K1-K11 and the wake-up control signal point C1.

According to embodiments presented herein, each key K1-K11 is configured to, when actuated, cause (via the common point P1 going high) at least one switch S1, S2 to close, causing the voltage bus VCC to be connected to a wake-up control signal point C1, i.e. the control signal point C1 going high.

Optionally, a power regulator 8 is provided to selectively supply power to the MCU 20. When the wake-up signal C1 is activated (e.g. by going high), this causes a power regulator 8 to start supplying power to the MCU 20 (from VCC) via a power point 7 to thereby power up the MCU 20, to transition from the low-power state to an active state, where the MCU is fully operational. The power regulator 8 can e.g. be a DC (Direct Current)/DC converter such, as a buck-boost converter or any other suitable power regulator that uses the VCC as input and provides a suitable voltage as output to power the MCU 20. Depending on the MCU configuration and VCC voltage, the power regulator can be omitted, in which case the second switch S2, when closed, connects VCC to the power point 7.

Optionally, the power point 7 is connected to a third switch S3 such that when the power point 7 goes high, the third switch S3 closes. The third switch S3 closing, in turn, causes a set of port circuits 15*a*-*c* to be in a conducting state. The port circuits 15*a*-*c* can be configured in any suitable manner that fulfils this function. For instance, each port circuit 15*a*-*c* can comprise a respective port switch S4-S6 whose gate is controlled by the third switch S3. The main circuit of the respective port switch S4-S6 is connected, via a respective inline resistor R8-R10, to one pole of the keys of the respective column. The gate terminal of the port switches S4-S6 is also connected, via a respective resistor R5-R7, to the key side (e.g. source) of the main current path of the respective port switch S4-S6. The other side (e.g. drain) of the main current path of the respective port switch S4-S6 is connected to the respective column key connection 3a-c.

In this way, when the third switch S3 closes (triggered by the wake-up signal and power regulator 8), this causes the port switches S4-S6 to connect the keys K1-K11 with the column key connections 3a-c, and thus with the column pins of the MCU.

When in the low-power state, the third switch S3 is turned off by a resistor R4 which in turn causes the port switches S4-S6 to be turned off. When the port switches S4-S6 are turned off, the column key connections 3a-3c are disconnected from the inline resistors R8-R10 and hence also from the keys K1-K11 of the keypad. In this way, backward leakage is stopped from the keypad columns via the column key connections 3a-3c into the MCU pins in the low-power state. Hence, the port circuits 15a-c (optionally along with the third switch S3) ensures proper wake-up operation and also reduce power consumption of the keypad 1 when in the low-power state.

It is to be noted that the port circuits can equally well instead be provided between the keys K1-K11 and the row connections 3d-3g. In short, the port circuits 15a-c, provided in connection with each one of the row key connections/3d-g and/or each one of the column key connections, are each configured to connect the key connection 3a-g with keys K1-K11 of the keypad 1 when the wake-up signal is activated, and each port circuit 15a-c comprises a respective port switch S4-S6 that is turned off in the low-power state to disconnect the column key connections 3a-3c or row key connections 3d-g from the keys K1-K11 of the keypad. In this way, A resulting technical effect is that no electrical power can flow through the keys when in the low-power state, preventing leakage current in low-power state (in addition to setting the MCU in a low-power state). Even if the leakage current is small, keypads in the field are mostly in the low-power state, whereby any reduction of power, no matter how small, when the keypad is in the low-power state gives a significant reduction in power consumption. Power consumption of the keypad is thus reduced.

When the MCU 20 is in the active state, the second (detection) phase starts. The MCU 20 then detects which one of the plurality of keys K1-K11 was actuated. This can occur e.g. by scanning key connection combinations, i.e. all combination of a row key connection and a column key connection, to find where there is a connection between a row and a column, indicating which key was actuated. The transition from the low-power state to the active state of the MCU 20 is quick (in the order of 10s or few 100s of milliseconds) such that a single key actuation by a user will cause both the wake-up of the MCU 20 and a correct detection of the key that is actuated. The reading of the detected key is provided from the MCU to the electronic device 30.

After detection of the actuated key, the MCU 20 can stay in the active state to detect further actuations of the keys K1-K11. A time-out can be defined for when the MCU 20 enters the low-power state again after a period of no key actuations.

When in the low-power state, the MCU 20 is not supplied with power, causing minimal leakage. Moreover, no voltage is supplied to any I/O pins of the MCU 20 (via the key connections 3a-g). This increases power efficiency of the keypad 1, thus significantly extending battery life.

Using embodiments presented herein, the keys are used both to trigger the wake-up of the MCU as well as for user input. Moreover, since this solution does not supply power to the MCU I/O pins (via the key connections 3a-g) when in the low-power state, leakage current in the MCU is greatly reduced.

Here now follows a list of embodiments, enumerated with roman numerals.

i. A keypad comprising:
　a voltage bus configured to distribute power in the keypad; and
　a plurality of keys respectively actuable to cause closing of a circuit;
　wherein each key is configured to, when actuated, cause at least one switch to close, causing the voltage bus to be connected to a wake-up control signal point;
　wherein the wake-up signal is activated when connected to the voltage bus, causing a microcontroller to transition from a low-power state to an active state such that the microcontroller can detect which one of the plurality of keys was actuated.

ii. The keypad according to embodiment i, further comprising a power regulator configured to selectively supply power to the MCU, wherein the wake-up signal being activated the power regulator to start supplying power to the microcontroller to thereby power up the microcontroller.

iii. The keypad according to embodiment ii, wherein the power regulator is a DC/DC converter.

iv. The keypad according to any one of the preceding embodiments, wherein a low-pass filter is provided between the plurality of keys and the at least one switch.

v. The keypad according to any one of the preceding embodiments, wherein the keypad keys are provided in a matrix with rows and columns, wherein the keypad further comprises:
　a plurality of row key connections and
　a plurality of column key connections;
　wherein each key is connected to a single row key connection and a single column key connection, such that when actuated, each key provides a connection between a single column key connection and a single row key connection.

vi. The keypad according to embodiment v, wherein each one of the row key connections and/or each one of the column key connections is provided with a respective port circuit that is configured to connect the key connection with keys of the keypad when the wake-up signal is activated.

vii. The keypad according to any one of the preceding embodiments, wherein each key is configured to, when actuated, connect the voltage bus to a control terminal of a first switch, thereby supplying a control signal to a second switch that closes a connection between the voltage bus and the wake-up signal.

viii. The keypad according to any one of the preceding embodiments, wherein at least one diode is provided between the plurality of keys and the at least one switch.

ix. The keypad according to any one of the preceding embodiments, further comprising the microcontroller.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A keypad comprising:
a voltage bus configured to distribute power in the keypad;
a plurality of keys respectively actuable to cause closing of a circuit;
a plurality of row key connections; and
a plurality of column key connections;
wherein each key is configured to, when actuated, cause at least one switch to close, causing the voltage bus to be connected to a wake-up control signal point;
wherein a wake-up signal is activated when connected to the voltage bus, causing a microcontroller to transition from a low-power state to an active state such that the microcontroller can detect which one of the plurality of keys was actuated; and
wherein the keypad keys are provided in a matrix with rows and columns:
wherein each key is connected to a single row key connection and a single column key connection, such that when actuated, each key provides a connection between a single column key connection and a single row key connection;
wherein each one of the row key connections and/or each one of the column key connections is provided with a respective port circuit that is configured to connect the key connection with keys of the keypad when the wake-up signal is activated; and
wherein each port circuit comprises a respective port switch that is turned off in the low-power state to disconnect the column key connections or row key connections from the keys of the keypad; and
wherein a low-pass filter is provided between the plurality of keys and the at least one switch.

2. The keypad according to claim 1, further comprising a power regulator configured to selectively supply power to the microcontroller, wherein the wake-up signal being activated causes the power regulator to start supplying power to the microcontroller to thereby power up the microcontroller.

3. The keypad according to claim 2, wherein the power regulator is a DC/DC converter.

4. The keypad according to claim 1, wherein each key is configured to, when actuated, connect the voltage bus to a control terminal of a first switch, thereby supplying a control signal to a second switch that closes a connection between the voltage bus and the wake-up signal.

5. The keypad according to claim 1, wherein at least one diode is provided between the plurality of keys and the at least one switch.

6. The keypad according to claim 1, further comprising the microcontroller.

* * * * *